(12) United States Patent
Han et al.

(10) Patent No.: US 9,792,314 B2
(45) Date of Patent: *Oct. 17, 2017

(54) METHOD AND APPARATUS FOR OBTAINING CONTENT IN SCREENSHOT

(71) Applicant: International Business Machines Corporation, Armonk, NY (US)

(72) Inventors: Biao Han, Beijing (CN); Sheng Bo Hou, Beijing (CN); Zhong Tian, Beijing (CN); Hua Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/294,929

(22) Filed: Oct. 17, 2016

(65) Prior Publication Data

US 2017/0052996 A1    Feb. 23, 2017

Related U.S. Application Data

(63) Continuation of application No. 13/888,660, filed on May 7, 2013, now Pat. No. 9,542,470.

(30) Foreign Application Priority Data

May 24, 2012    (CN) .......................... 2012 1 0164879

(51) Int. Cl.
*G06F 7/00*      (2006.01)
*G06F 17/30*    (2006.01)
*G06Q 10/10*   (2012.01)
*G06F 9/54*      (2006.01)

(52) U.S. Cl.
CPC ........ *G06F 17/30345* (2013.01); *G06F 9/543* (2013.01); *G06F 17/30253* (2013.01); *G06F 17/30256* (2013.01); *G06F 17/30595* (2013.01); *G06F 17/30876* (2013.01); *G06Q 10/10* (2013.01)

(58) Field of Classification Search
CPC ............... G06F 3/0481; G06F 17/2241; G06F 17/30896; G06F 2203/04803
USPC ......................................... 707/736; 715/753
See application file for complete search history.

(56) References Cited

U.S. PATENT DOCUMENTS

| | | |
|---|---|---|
| 7,167,182 B2 | 1/2007 | Butler |
| 7,360,164 B2 | 4/2008 | Bjoernsen et al. |
| 7,398,470 B2 | 7/2008 | Keane |
| 7,565,419 B1 | 7/2009 | Kwiatkowski et al. |
| 8,185,828 B2 | 5/2012 | Liu et al. |
| 8,341,538 B1 | 12/2012 | Antczak et al. |
| 2005/0010639 A1 | 1/2005 | Long et al. |

(Continued)

FOREIGN PATENT DOCUMENTS

| | | |
|---|---|---|
| CN | 101650740 A | 2/2010 |
| CN | 102421012 A | 4/2012 |

*Primary Examiner* — Cheyne D Ly
(74) *Attorney, Agent, or Firm* — Brian J. Colandreo, Esq.; Jeffrey T. Placker, Esq.; Holland & Knight LLP

(57) ABSTRACT

Embodiments of the present disclosure may include a method and apparatus for obtaining the content in a screenshot. In the embodiments of the present disclosure, content organization information associated with the screenshot may be obtained, wherein the content organization information may include the structure and data of one or more data objects associated with the content in the screenshot. The content in the screenshot may be determined based on the content organization information.

18 Claims, 8 Drawing Sheets

(56) References Cited

U.S. PATENT DOCUMENTS

| | | |
|---|---|---|
| 2007/0282793 A1 | 12/2007 | Majors et al. |
| 2009/0183087 A1 | 7/2009 | Robins |
| 2009/0249189 A1 | 10/2009 | Jania et al. |
| 2010/0131868 A1 | 5/2010 | Chawla et al. |
| 2011/0016420 A1 | 1/2011 | Millman |
| 2013/0007235 A1 | 1/2013 | Humphreys et al. |

200

300

METHOD AND APPARATUS FOR OBTAINING CONTENT IN SCREENSHOT

RELATED APPLICATIONS

The subject application is a continuation application of U.S. patent application with Ser. No. 13/888,660, filed on May 7, 2013, which is based on and claims the benefit of priority from Chinese Patent Application 201210164879.4, filed on May 24, 2012, the entire disclosure of which are incorporated herein by reference.

FIELD OF THE INVENTION

The present disclosure generally relates to computer technology, and more specifically, to a method and apparatus for obtaining content in a screenshot.

BACKGROUND

Desktop sharing, application sharing and document sharing in web conferences are common functions of a web conference system. By means of these functions, the presenter and the participants can directly and instantaneously interact with each other. Typically the presenter shares and conveys the content of presentation via a web conference server, and the participants view the content shared and conveyed by the presenter from screenshots presented on screens nearby.

The content conveyed by the presenter is usually presented to the participants in the form of screenshots or images. However, the existing web conference software or website does not provide the participants with the function of obtaining the content of the screenshots. Often, the participants are not able to copy, save and perform other operations to the content of the shared screenshots, when they are interested in and want to get the content. The screenshot is updated all times through the presentation. In this case, the participant gets the content conveyed by the presenter via copy or email, or captures the screenshot and then manually writes down the desired content, or obtains the desired content by identifying the captured screenshot (such as by means of optical character recognition (OCR), etc.).

However, the above methods often include a lot of redundant work and inconvenience to the participants (hereinafter referred to as "users") of the web conference, reduces instantaneity and efficiency of the participation, and significantly affects participation experience of the participants.

SUMMARY

According to one aspect of the present disclosure, there is provided a method for obtaining the content in a screenshot. The method may include obtaining content organization information associated with the screenshot, wherein the content organization information comprises the structure and data of one or more data objects associated with the content in the screenshot. The method may also include determining the content in the screenshot based on the content organization information.

According to another aspect of the present disclosure, there is provided an apparatus for obtaining the content in a screenshot. The apparatus may include an obtaining unit configured to obtain content organization information associated with the screenshot, wherein the content organization information comprises the structure and data of one or more data objects associated with the content in the screenshot.

The apparatus may also include a determining unit configured to determine the content in the screenshot based on the content organization information.

It is to be understood through the description below that, according to some embodiments of the present disclosure, a user (e.g., a participant in a web conference) may conveniently obtain the content in a screenshot, thereby significantly reducing redundant work and inconvenience brought to the user and efficiently improving immediacy and efficiency of the user's operations.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
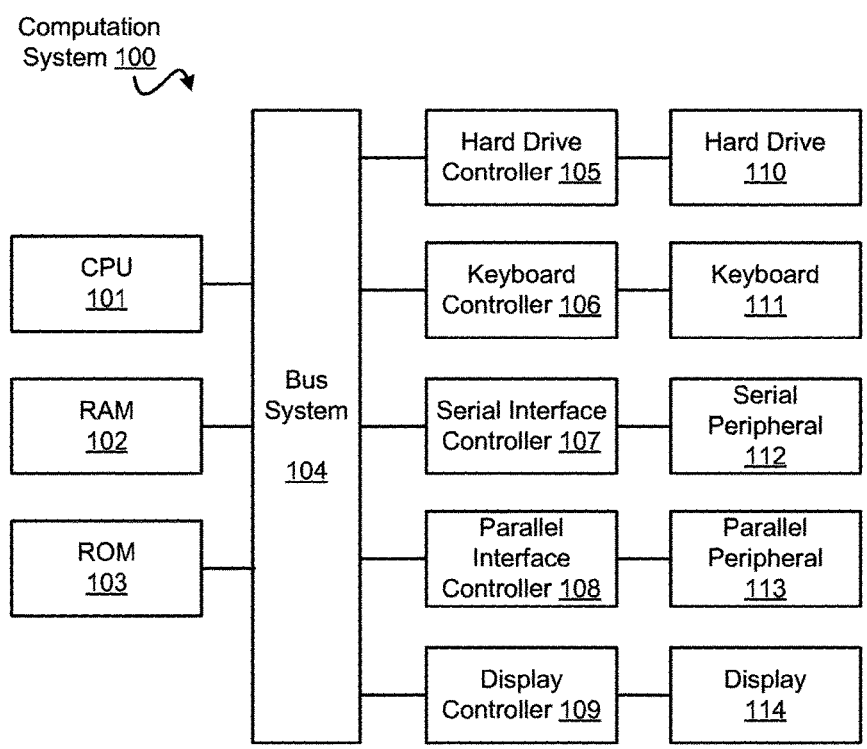
FIG. 1 shows an example computer system 100 which is applicable to implement the embodiments of the present disclosure.

FIG. 1 shows an example computer system 100 which is applicable to implement the embodiments of the present disclosure. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the example purpose rather than any limitation to the present disclosure. In some cases, some devices may be added to or removed from the computer system 100 based on specific situations.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

According to the embodiments of the present disclosure, the "screenshot" may be presentation of an application that is currently known or to be developed in future by using any proper language and web technology, and of each object in the application. A screenshot may be an image of a screen, in which image there are presented desktops, applications, and documents the shot provider wants to share with users, such as PowerPoint (PPT), PDF, WORD files being shown by a presenter in a web conference, or software development applications and test tools the presenter wants to demonstrate to the participants, etc. The scope of the present disclosure is not limited in this regard.

According to the embodiments of the present disclosure, the "content" may include any part or combination of text segments, formulae, image segments, audio or video, windows, and applications in an image presented by a screenshot. It is to be understood that the foregoing examples are merely illustrative, the content may be any part of a screenshot those skilled in the art may understand and contemplate, and the present disclosure should be not limited to the foregoing examples.

According to the embodiments of the present disclosure, the "content organization information" may include the structure and data of one or more data objects associated with the content of a screenshot. Content organization information may be a set including one or more data objects each having a structure and data.

According to the embodiments of the present disclosure, the "data object" may be associated with a certain part of a screenshot, the data object comprising the structure and data of the content of this part. For example, a data object may be associated with a certain application in a screenshot, a certain window in this application, or a certain word segment in this window. The structure of a data object may indicate the relationship of this data object with other data object in the same screenshot, such as an inclusion relationship, a belonging relationship, a parallel relationship, etc. The structure of a data object may be represented in the form of a "tree" structure or described using a text file, an XML file, a database file and any other proper means available to those skilled in the art. The data of a data object may indicate the specific content to which this data object corresponds, such as text, pictures, etc.

According to the embodiments of the present disclosure, the "version identifier" may include a unique identifier for identifying a screenshot associated with one or more data objects, and the "data object identifier" may include a unique identifier for identifying a certain one of one or more data objects associated with a certain screenshot. Hence, the data object identifier and the version identifier may uniquely identify a certain data object in a plurality of screenshots. For example, suppose three screenshots are stored in a shot server, then each of the screenshots has its own "version identifier," namely V1, V2 and V3 respectively; meanwhile, suppose the screenshot with the version identifier V1 is associated with two data objects O1 and O2, the screenshot with a version identifier V2 is associated with only one data object, O1, and the screenshot with the V3 version identifier is associated with three data objects, O1, O2 and O3. It can be seen that each of these three screenshots may be associated with one identical data object, namely O1. At this point, by means of the data object identifier only, it may be impossible to determine "O1" refers to a data object in which one of the three screenshots. Hence, the version identifier and the data object identifier may be used together for uniquely identifying a certain data object in a plurality of screenshots.

Figure 2:
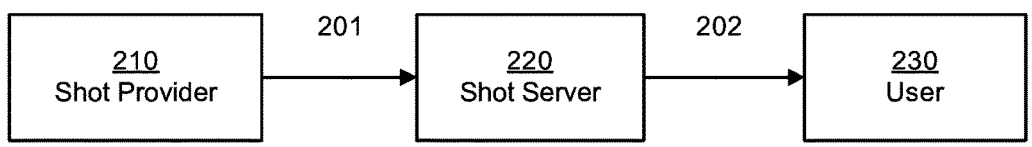
FIG. 2 shows a schematic view of a system 200 for obtaining the content in a screenshot according to an example embodiment of the present disclosure.
Figure 3:
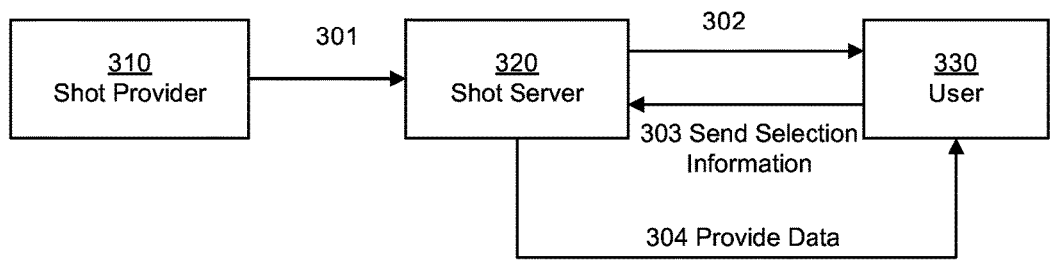
FIG. 3 shows a schematic view of a system 300 for obtaining the content in a screenshot according to a further example embodiment of the present disclosure.

The present disclosure proposes a technical solution for obtaining the content in a screenshot, wherein the screenshot may be shared with users (e.g., participants of a web conference) by a shot provider (e.g., a presenter of the web conference) via a shot server. FIGS. 2 and 3 respectively show a schematic view of a system 200 and system 300 for obtaining the content in a screenshot according to two different example embodiments of the present disclosure.

In the system 200 shown in FIG. 2, according to an embodiment of the present disclosure, a shot provider 210 may send 201 a screenshot to a shot server 220; the shot server 220 may generate content organization information associated with the screenshot based on the screenshot and send 202 to a user 230 the screenshot together with data of a data object in the content organization information; in this manner, the user 230 may receive the content in the screenshot while receiving the screenshot from the shot server.

In the system 200 shown in FIG. 2, according to other embodiment of the present disclosure, the shot provider 210 may generate content organization information associated with the screenshot based on the screenshot and send 201 to the shot server 220 the screenshot together with the generated content organization information; the shot server 220 sends 202 to the user 230 the screenshot together with the content organization information; then, the user 230 may obtain the content in the screenshot based on the content organization information received from the shot server.

In the system 300 shown in FIG. 3, according to an embodiment of the present disclosure, a shot provider 310 may send 301 to a shot server 320 the screenshot and/or content organization information associated with the screenshot; the shot server 320 obtains the content organization information associated with the screenshot and sends 302 the screenshot to a user; after selecting the content desired to be obtained from the screenshot, the user 330 sends 303 selection information to the shot server 320, wherein the selection information may, for example, comprise location information of user-desired content in the screenshot; the shot server 320 determines, according to the location information, a data object identifier and aversion identifier of a data object associated with the content, then determines data associated with the user-desired content in the screenshot, and provides 304 the determined data to the user 330, so that the user may obtain the content in the screenshot.

In the system 300 shown in FIG. 3, according to an embodiment of the present disclosure, the shot provider 310 may send 301 to the shot server 320 the screenshot and/or content organization information associated with the screenshot; the shot server 320 obtains the content organization information associated with the screenshot and sends 302 to the user 330 the screenshot and a part of the content organization information; after selecting the content desired to be obtained from the screenshot, the user 330 sends 303 selection information to the shot server 320, wherein the selection information may, for example, comprise a data object identifier and a version identifier of a data object associated with the user-desired content, and the data object identifier and the version identifier may be determined at the user side based on location information of the user-desired content in the screenshot and on the part of the content organization information; the shot server 320 may determine data associated with the user-desired content in the screenshot according to the received data object identifier and version identifier, and provides 304 the determined data to the user 330, so that the user may obtain the content in the screenshot. The part of the content organization information may be structures of one or more data objects of the content organization information.

It is to be understood that although FIG. 2 shows only one user 230, this is illustrative; in practical applications, the shot server 220 may send a screenshot to a plurality of users, other than one user. Similarly, in the embodiment shown in FIG. 3 there may be a number of other users than the user 330 who interact with the shot server 320.

Figure 4:
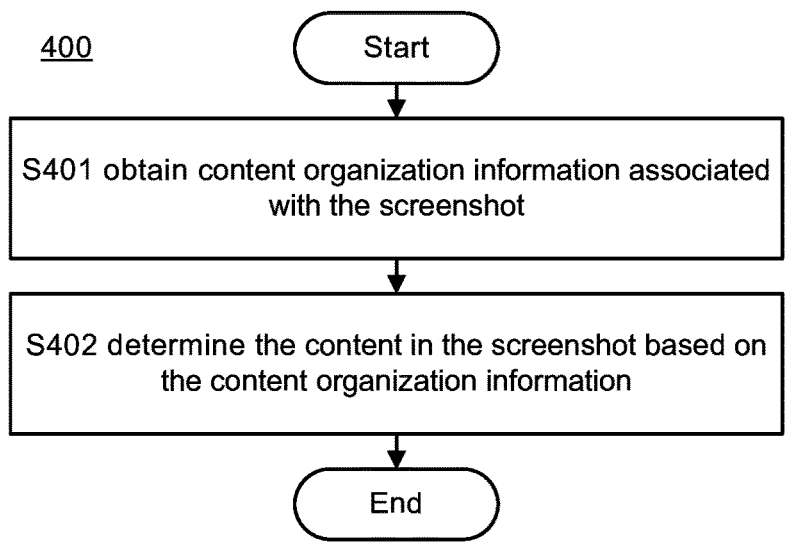
FIG. 4 shows a schematic flowchart of a method 400 for obtaining the content in a screenshot according to an example embodiment of the present disclosure.

Reference is now made to FIG. 4, which shows a schematic flowchart of a method 400 for obtaining the content in a screenshot according to an example embodiment of the present disclosure.

After the method 400 starts, at block S401, content organization information associated with the screenshot may be obtained, wherein the content organization information may include the structure and data of one or more data objects associated with the content of the screenshot.

According to the embodiment of the present disclosure, content organization information associated with the screenshot may be generated, so that the content organization information is obtained. The content organization information may be generated by multiple implementations. For example, at least one application in the screenshot may be obtained first, a data object in each of the at least one application may be looked up, and then the structure and data of data objects may be determined based on the screenshot, the at least application and the data objects in this/these applications, so that the content organization information associated with the screenshot may be obtained.

According to the embodiment of the present disclosure, content organization information associated with the screenshot may be received from other apparatus, so that the content organization information is obtained. The content organization information may be generated at the shot provider, for example, at a remote server or local device of the shot provider.

According to the embodiment of the present disclosure, after the content organization information associated with the screenshot is obtained, the screenshot and the obtained content organization information may be stored in a memory directly, and meanwhile, a new data object identifier and a version identifier may be allocated to each data object in the content organization information. As described above, the data object identifier and the version identifier may uniquely identify a certain data object in a plurality of screenshots. The memory may be, for example, a hard drive, a removable memory like an optical disk or floppy disk, online storage, a flash memory, etc., or other storage device that is usable to or commonly used by those skilled in the art.

According to other embodiments of the present disclosure, after the content organization information associated with the screenshot is obtained, all data objects in the obtained content organization information may not be stored directly, but only data objects that are newly added or whose data has been changed are stored so as to save overheads of storage. For example, previously stored content organization information that is associated with the screenshot may be looked up; the obtained content organization information is compared with the previously stored content organization information; if a data object in the obtained content organization information is not present in the previously stored content organization information, then adding operation may be performed for the data object; and if a data object in the obtained content organization information is present in the previously stored content organization information, then updating operation may be performed for the data object in response to data of the data change being changed. According to other embodiments of the present disclosure, in response to performing adding operation for a data object, a new data object identifier and a new version identifier may be set for the data object; in response to performing updating operation for a data object, a new version identifier may be set for the data object, and a data object identifier same as that of the previously stored data object may be set for the data object.

At block S402, the content in the screenshot may be determined based on the content organization information.

According to an embodiment of the present disclosure, data associated with all content in the screenshot may be sent to the user so as to be used by the user directly. In this embodiment, data of one or more data objects in the content organization information may be extracted, and the extracted data is transferred to the user. In this manner, in addition to sending the screenshot to the user, data corresponding to all content in the screenshot is transferred to the user at the same time, so that it is convenient for the user to obtain all content in the screenshot.

According to an embodiment of the present disclosure, data associated with content in the screenshot which the user is interested in may be sent to the user according to the user's selection, so that the resources are saved while the system throughput is improved. In this embodiment, the user's selection information may be received, wherein the selection information indicates information on user-desired content in the screenshot; then, data associated with the user-desired content in the screenshot may be determined based on the selection information and the content organization information; afterwards, the determined data may be transferred to the user.

According to an embodiment of the present disclosure, the user's selection information may comprise location information of the user-desired content in the screenshot. According to other embodiments of the present disclosure, the user's selection information may comprise a data object identifier and a version identifier of a data object associated with the user-desired content.

According to an embodiment of the present disclosure, when the user's selection information comprises location information of the user-desired content in the screenshot, the location information of the user-desired content in the screenshot may be received. Then, the location information of the user-desired content may be extracted from the selection information; a data object identifier and a version identifier of a data object associated with the content may be determined based on the location information and the structure of one or more data objects of the content organization information; and data associated with the user-desired content in the screenshot may be determined from data of the one or more data objects of the content organization information, according to the determined data object identifier and the version identifier.

According to an embodiment of the present disclosure, when the user's selection information comprises a data object identifier and a version identifier of a data object associated with the user-desired content, a data object identifier and a version identifier of a data object associated with the user-desired content may be received, wherein the data object identifier and the version identifier may be determined at the user. Then, the data object identifier and the version identifier of the data object associated with the user-desired content may be extracted from the selection information; and data associated with the user-desired content in the screenshot may be determined from data of the one or more data objects of the content organization information according to the data object identifier and the version identifier.

The method 400 ends after block S402.

Figure 5:
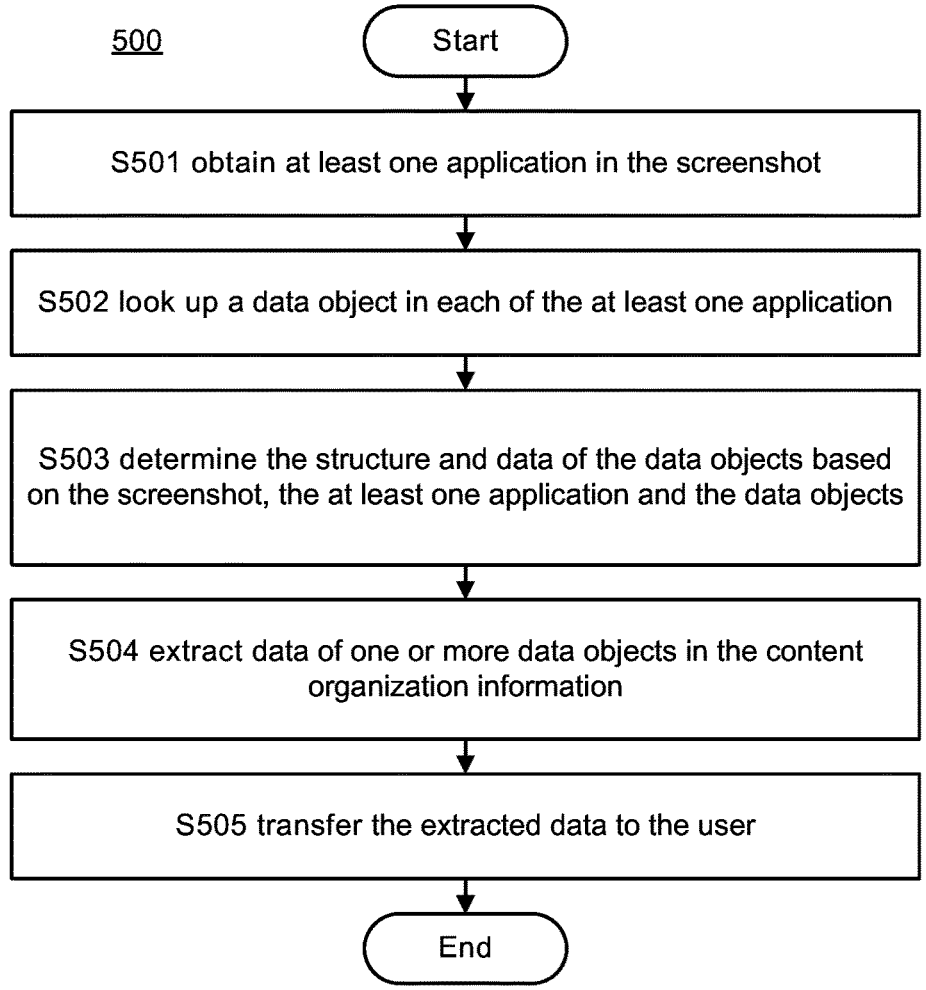
FIG. 5 shows a schematic flowchart of a method 500 for obtaining the content in a screenshot according to an example embodiment of the present disclosure.

Reference is now made to FIG. 5, which shows a schematic flowchart of a method 500 for obtaining the content of a screenshot according to an example embodiment of the present disclosure.

In the embodiment shown in FIG. 5, the screenshot may be shared with the user by a shot provider via a shot server, and content organization information associated with the screenshot is generated at the shot server. According to an embodiment of the present disclosure, the process of generating the content organization information may be completed at the shot provider, and the shot server obtains the content organization information from the shot server. According to other embodiments of the present disclosure, the content organization information may also be generated at the shot server. The embodiment shown in FIG. 5 describes a case that the content organization information is generated at the shot server.

In addition, in the embodiment shown in FIG. 5, data transferred to the user may be data associated with all content in the screenshot, and upon receipt of the data, the user may copy and/or save the data or select desired data to be copied and/or saved according to needs.

The content organization information associated with the screenshot may be generated by several means. For example, at least one application in the screenshot may be obtained first, a data object in each of the at least one application may be looked up, and then the structure and data of these data objects are determined based on the screenshot, the at least one application and the data objects, so that the content organization information associated with the entire screenshot is obtained.

After the method 500 starts, at least one application in the screenshot is obtained at block S501.

According to an embodiment of the present disclosure, the shot server may create a root node based on the current screenshot, and communicates with an operating system interface of the shot provider to obtain a window list of a currently shared desktop. For example, handlers of all windows may be obtained by an application program interface (API) of a shot provider operating system. Then, window nodes may be created based on these windows. The window node may comprise the size, location and other information of a window. For one of these windows, it may be possible to obtain, via the application program interface, a unique identifier of one or more objects like text paragraphs, images and audio that are displayed in the current window, as well as location, size, content and other information thereof, to create the corresponding one or more data objects. The created data objects may be used as child nodes of the window being processed currently. Then, a next window is processed until all windows are processed. Through the processing, the content organization information may be generated at the shot provider. It is to be understood that the foregoing procedure is merely example, and those skilled in the art may generate the content organization information by using other proper approaches or technical means in the art.

At block S502, a data object in each of the at least one application may be looked up.

At block S503, the structure and data of the data objects may be determined based on the screenshot, the at least one application and the data objects.

In an embodiment of the present disclosure, during generating of the content organization information associated with the screenshot, first the location, size and layer information of each application window on the screen and desktop obtained by, for example, communicating with an operating system of the shot provider, are recorded for creating a root node and intermediate node in a data object graph; then, the location, size, layer, data type, data content information, etc. of each internal unit of each application are obtained by communicating with each application of the shot server, for creating leaf nodes in the data object graph. Through the foregoing creation, a data object graph containing a three-layered tree may be obtained. The data object graph may be the content organization information associated with the screenshot in this embodiment.

At block S504, data of one or more data objects in the content organization information may be extracted.

At block S505, the extracted data may be transferred to the user.

Data of one data object in the content organization information may include data associated with certain content in the screenshot. After transferring the data to the user, the user may select desired data according to needs, whereby relevant content in the screenshot is obtained.

The method 500 ends after block S505.

Figure 6:
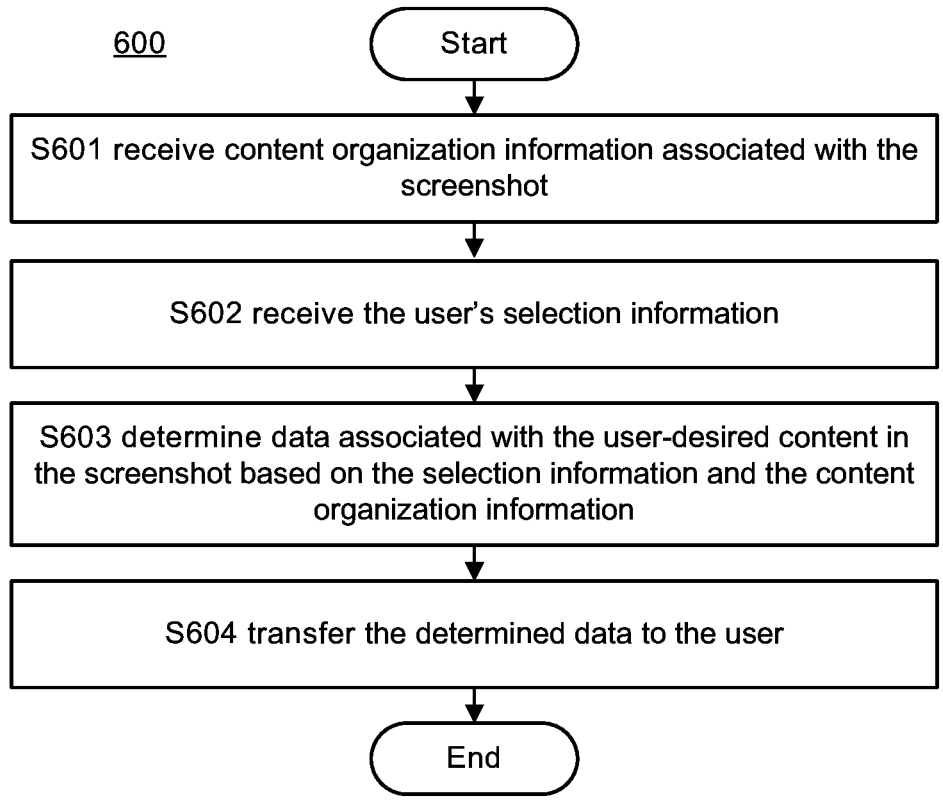
FIG. 6 shows a schematic flowchart of a method 600 for obtaining the content in a screenshot according to an example embodiment of the present disclosure.

With reference to FIG. 6 now, this figure shows a schematic flowchart of a method 600 for obtaining the content of a screenshot according to an example embodiment of the present disclosure.

In the embodiment shown in FIG. 6, the screenshot may be shared with the user by a shot provider via a shot server, and besides the screenshot, the shot provider may further provide to the shot server content organization information associated with the screenshot. As described above, the content organization information may be generated at the shot server, just like the embodiment as shown in FIG. 5, and also, it may be generated at the shot provider. Subsequently, the shot server may obtain the content organization information from the shot provider. The embodiment shown in FIG. 6 describes generating of the content organization information at the shot provider. It is to be understood that according to other embodiments of the present disclosure, the content organization information may also be generated at the shot server.

In addition, in the embodiment shown in FIG. 6, data transferred to the user may include data associated with part or all of content in the screenshot, which is determined according to the user's selection; and upon receipt of the data, the user may copy and/or save the data or perform other operations to the data.

After the method 600 starts, content organization information associated with the screenshot may be received at block S601.

According to an embodiment of the present disclosure, content organization information associated with the screenshot may be received from the shot provider where the content organization information may be generated in various manners. In an embodiment, a root node may be generated based on the current screenshot, and a window list of a currently shared desktop may be obtained by calling an operating system interface. For example, handlers of all windows may be obtained by an API of the operating system. Then, window nodes may be created based on these windows. The window node may comprise the size, location and other information of a window. For one of these windows, it may be possible to obtain, via the application program interface, a unique identifier of one or more objects like text paragraphs, images and audio that can be displayed in the current window, as well as location, size, content and other information thereof, to create the corresponding one or more data objects. The created data objects may be used as child nodes of the window being processed currently. Then, a next window may be processed until all windows are processed. Through the processing, the content organization information may be generated at the shot provider. It is to be understood that the foregoing procedure is merely example, and those skilled in the art may generate the content organization information by using other proper approaches or other proper technical means in the art.

According to an embodiment of the present disclosure, after the screenshot and the content organization information associated with the screenshot are received from the shot provider, the received screenshot and its associated content organization information may be stored in a memory directly, and meanwhile, a new data object identifier and a version identifier are allocated to each data object in the content organization information.

According to other embodiments of the present disclosure, after the screenshot and the content organization information associated with the screenshot are received from the shot provider, all data objects in the content organization information may not be stored directly, but only data objects that are newly added or whose data has been changed are stored so as to save overheads of storage. For example, previously stored content organization information that is associated with the screenshot may be looked up; the received content organization information may be compared with the previously stored content organization information; if a data object in the received content organization information is not present in the previously stored content organization information, then performing adding operation for the data object; and if a data object in the received content organization information is present in the previously stored content organization information, then performing updating operation for the data object in response to data of the data change being changed. According to other embodiments of the present disclosure, when performing adding operation for a data object, a new data object identifier and a new version identifier are set for the data object; when performing updating operation for a data object, a new version identifier is set for the data object, and the same data object identifier as the previously stored data object is set for the data object.

At block S602, the user's selection information may be received.

According to an embodiment of the present disclosure, the user's selection information may comprise location information of the user-desired content in the screenshot and/or a data object identifier and a version identifier of a data object associated with the user-desired content.

In an embodiment of the present disclosure, at block S602 location information of the user-desired content in the screenshot, such as the content's X coordinate, Y coordinate and/or relative location relationship in the screenshot, may be received.

In another embodiment of the present disclosure, at block S602 a data object identifier and a version identifier of a data object associated with the user-desired content may be received, wherein the data object identifier and the version identifier may be determined at the user.

At block S603, data associated with the user-desired content in the screenshot may be determined based on the selection information and the content organization information.

In an embodiment of the present disclosure, the selection information may include location information of the user-desired content in the screenshot. At this point, the location information may be extracted from the selection information; a data object identifier and a version identifier of a data object associated with the user-desired content may be determined based on the location information and the structure of one or more data objects of the content organization information; and data associated with the user-desired content in the screenshot may be determined from data of the one or more data objects of the content organization information according to the determined data object identifier and version identifier.

In an embodiment of the present disclosure, the selection information may include a data object identifier and a version identifier of a data object associated with the user-desired content. At this point, the data object identifier and the version identifier may be extracted from the selection information; then, data associated with the user-desired content in the screenshot may be determined from data of the one or more data objects of the content organization information according to the data object identifier and the version identifier.

It is to be understood that according to an embodiment of the present disclosure, the data object identifier and the version identifier may be completed at the user (e.g., a remote server or local device at the user). In this case, the shot server sends to the user a part of the content organization information, such as the structure of one or more data objects in the content organization information. A device at the user side may determine a data object associated with the user-desired content in the screenshot according to the structures of these data objects, and may then obtain a data object identifier and a version identifier of the data object. Additionally, according to an embodiment of the present disclosure, the data object identifier and the version identifier may be completed at the shot server. The shot server may use the structures of one or more data objects in the obtained content organization information to determine a data object associated with the user-desired content in the screenshot and subsequently obtain a data object identifier and a version identifier of the data object.

At block S604, the determined data may be transferred to the user.

The method 600 ends after block S604.

The methods 400-600 for obtaining the content in a screenshot according to embodiments of the present disclosure have been described by referring to FIGS. 4-6. An apparatus usable for implementing the above methods is described below with reference to FIG. 7.

Figure 7:
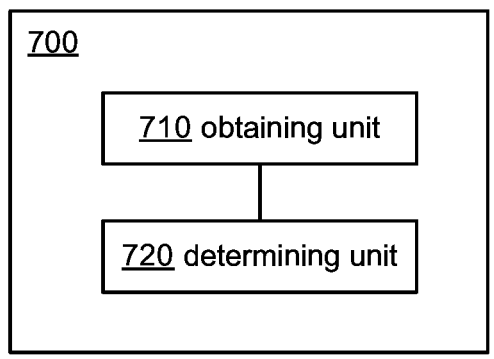
FIG. 7 shows a schematic flowchart of an apparatus 700 for obtaining the content in a screenshot according to an example embodiment of the present disclosure.

Now referring to FIG. 7, this figure shows a schematic block diagram of an apparatus 700 for obtaining the content in a screenshot according to an example embodiment of the present disclosure.

According to the embodiment of the present disclosure, the apparatus 700 may comprise: an obtaining unit 710 configured to obtain content organization information associated with the screenshot, wherein the content organization information may include the structure and data of one or more data objects associated with the content in the screenshot; and a determining unit 720 configured to determine the content in the screenshot based on the content organization information.

According to some embodiments of the present disclosure, the obtaining unit 710 may comprise: obtaining means configured to obtain at least one application in the screenshot; data object looking-up means configured to look up a data object in each of the at least one application; and determining means configured to determine the structure and data of the data object based on the screenshot, the at least one application and the data object.

According to some embodiments of the present disclosure, the obtaining unit 710 may comprise: receiving means configured to receive content organization information associated with the screenshot, wherein the content organization information is generated at a shot provider.

According to some embodiments of the present disclosure, the obtaining unit 710 may comprise: content organization information looking-up means configured to look up previously stored content organization information that is associated with the screenshot; comparing means configured to compare the obtained content organization information with the previously stored content organization information; adding means configured to, if a data object in the obtained content organization information is not present in the previously stored content organization information, perform adding operation for the data object; and updating means configured to, if a data object in the obtained content organization information is present in the previously stored content organization information, perform updating operation for the data object in response to data of the data object being changed. In response to performing adding operation for a data object, a new data object identifier and new version identifier are set for the data object; in response to performing updating operation for a data object, a new version identifier is set for the data object, and the same data object identifier as a previously stored data object is set for the data object.

According to some embodiments of the present disclosure, the determining unit 720 may comprise: extracting means configured to extract data of one or more data objects in the content organization information; and first transferring means configured to transfer the extracted data to a user.

According to some embodiments of the present disclosure, the determining unit 720 may comprise: selection information receiving means configured to receive user's selection information, wherein the selection information indicates information on user-desired content in the screenshot; content determining means configured to determine data associated with the user-desired content in the screenshot based on the selection information and the content organization information; and second transferring means configured to transfer the determined data to the user.

According to some embodiments of the present disclosure, the selection information receiving means of the determining unit 720 may comprise: location information receiving means configured to receive location information of the user-desired content in the screenshot.

According to some embodiments of the present disclosure, the selection information receiving means of the determining unit 720 may comprise: identifier receiving means configured to receive a data object identifier and a version identifier of a data object associated with the user-desired content, wherein the data object identifier and the version identifier are determined at the user.

According to some embodiments of the present disclosure, the content determining means of the determining unit 720 may comprise: location information extracting means configured to extract location information of the user-desired content from the selection information; identifier determining means configured to determine a data object identifier and a version identifier associated with a data object associated with the content, based on the location information and the structure of one or more data objects of the content organization information; and first data determining means configured to determine data associated with the user-desired content in the screenshot from data of one or more data objects of the content organization information, according to the data object identifier and the version identifier.

According to some embodiments of the present disclosure, the content determining means of the determining unit 720 may comprise: identifier extracting means configured to extract from the selection information a data object identifier and a version identifier of a data object associated with the user-desired content; and second data determining means configured to determine data associated with the user-desired content in the screenshot from data of one or more data objects of the content organization information, according to the data object identifier and the version identifier.

With reference to FIGS. 4-7, description has been presented above to the schematic flowcharts of the methods 400-600 and the schematic block diagram of the apparatus 700 for containing the content in a screenshot according to embodiments of the present disclosure. In the above embodiments of the present disclosure, content organization information associated with the screenshot may be generated at the shot provider, and the shot server obtains the content organization information by receiving it from the shot provider; alternatively, content organization information associated with the screenshot may also be generated at the shot server, so that obtaining of the content organization information may be achieved at the shot server. In embodiments shown in FIGS. 8-10 below, detailed description will be presented to the second scenario, i.e., the scenario in which content organization information is generated at the shot server.

Additionally, in the above embodiments of the present disclosure, when the user's selection information comprises location information of the user-desired content in the screenshot, the shot server may determine a data object identifier and a version identifier of a data object associated with the user-desired content according to the obtained content organization information; when the user's selection information comprises a data object identifier and a version identifier of a data object associated with the user-desired content, wherein the data object identifier and the version identifier of a data object are determined at the user, in which case the shot server may send at least part of the content organization information to a device at the user so that the device at the user determines the data object identifier and the version identifier according to the location information of the user-desired content in the screenshot and based on the at least part of the content organization information. In embodiments shown in FIGS. 8-10 below, detailed description will be presented to the second scenario, i.e., the scenario in which the user's selection information comprises a data object identifier and a version identifier of a data object associated with the user-desired content.

Figure 8:
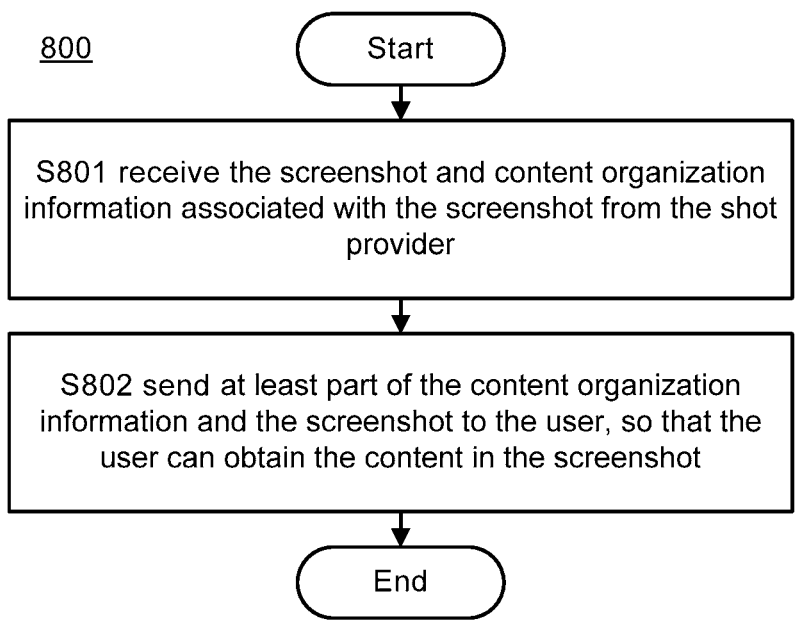
FIG. 8 shows a schematic flowchart of a method 800 for obtaining the content in a screenshot according to an example embodiment of the present disclosure.

Reference now is made to FIG. 8, which shows a schematic flowchart of a method 800 for obtaining the content in a screenshot according to an example embodiment of the present disclosure. In this embodiment, the screenshot may be shared with a user by a shot provider via a shot server. The method 800 may be used by the shot server.

After the method 800 starts, the screenshot and content organization information associated with the screenshot are received from the shot provider at block S801.

According to the embodiment of the present disclosure, the content organization information may comprise the structure and data of one or more data objects associated with the content in the screenshot.

According to the embodiment of the present disclosure, after the screenshot and the content organization information associated with the screenshot are received from the shot provider, the received screenshot and its associated content organization information may be stored in a memory directly, and meanwhile, a new data object identifier and a version identifier may be allocated to each data object in the content organization information. As described above, the data object identifier and the version identifier may uniquely identify a certain data object in a plurality of screenshots. The memory may be, for example, a hard drive, a removable memory like an optical disk or floppy disk, a flash disk, a flash memory, etc., or other storage device that is usable to or commonly used by those skilled in the art.

According to other embodiments of the present disclosure, after the screenshot and the content organization information associated with the screenshot are received from the shot provider, all data objects in the content organization information may not be stored directly, but only data objects that are newly added or whose data has been changed are stored so as to save storage overheads. For example, previously stored content organization information that is associated with the screenshot may be looked up; the received content organization information is compared with the previously stored content organization information; if a data object in the received content organization information is not present in the previously stored content organization information, then the data object is added; and if a data object in the received content organization information is present in the previously stored content organization information, then the data object may be updated in response to data of the data object being changed. According to other embodiments of the present disclosure, in response to adding a data object, a new data object identifier and a new version identifier are set for the data object; and in response to updating a data object, a new version identifier may be set for the data object, and a data object identifier same as that of the previously stored data object is set for the data object.

At block S802, at least part of the content organization information and the screenshot may be sent to the user, so that the user can obtain the content in the screenshot.

According to the embodiment of the present disclosure, the at least part of the content organization information may comprise the structure and data of one or more data objects in the content organization information. In this embodiment, reference may be made to the processing procedure of the system 200 as shown by the embodiment in FIG. 2. After the shot server sends to the user the screenshot and the structure and data of one or more data objects in the content organization information, selection information on user-desired content in the screenshot may be determined at a user side device according to the user's selection of desired content in the screenshot and the received structure of one or more data objects; then, the content in the screenshot may be obtained based on the data of one or more data objects and the selection information.

According to the embodiment of the present disclosure, as an alternative, the at least part of the content organization information may comprise only the structure of one or more data objects in the content organization information, excluding the data of the one or more data objects. In this embodiment, reference may be made to the processing procedure of the system 300 as shown by the embodiment in FIG. 3. After sending to the user the screenshot and the structure of one or more data objects in the content organization information, the shot server may receive selection information on user-desired content in the screenshot, then determines data associated with the user-desired content in the screenshot from the data of the one or more data objects based on the selection information, and finally transfers the determined data to the user.

According to the embodiment of the present disclosure, the selection information may comprise: location information on the user-desired content; or, a data object identifier and a version identifier of a data object associated with the content. It should be noted that the selection information is not limited to the examples, and those skilled in the art may use other known or common proper parameters or information in place of the examples.

The method 800 ends after block S802.

Figure 9:
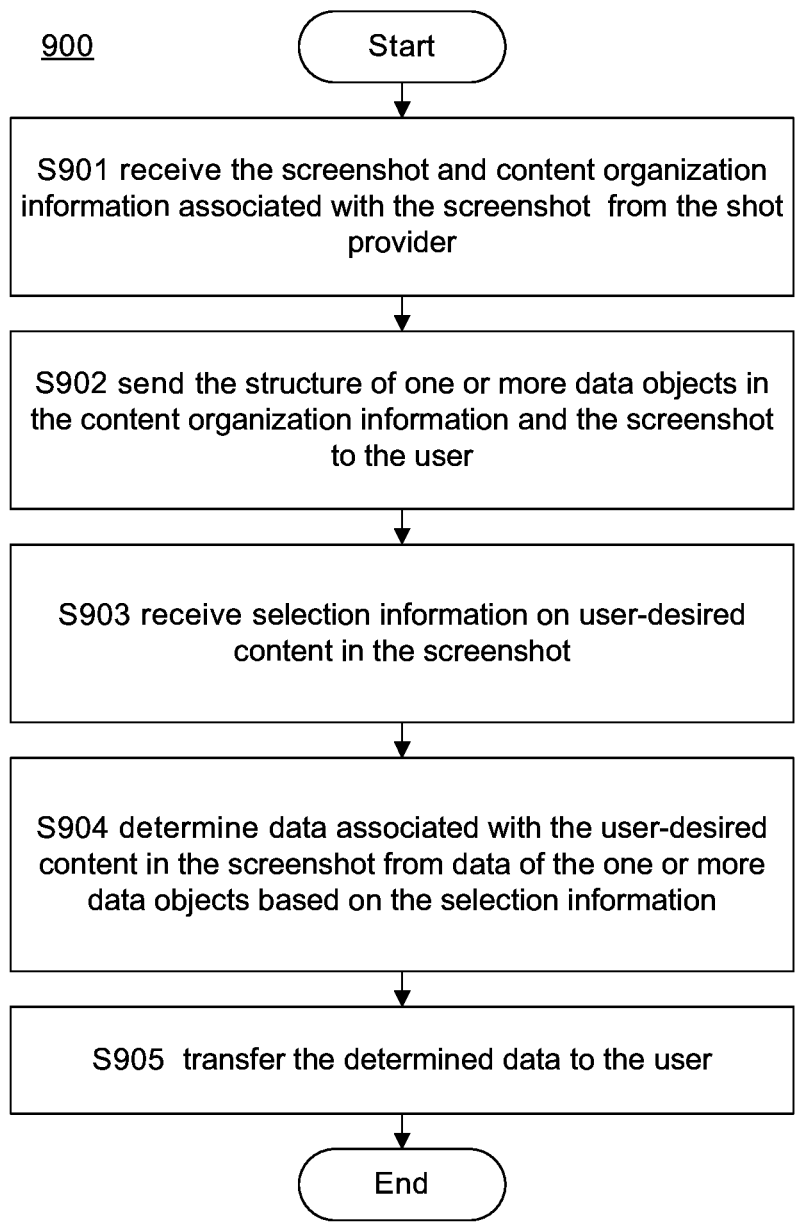
FIG. 9 shows a schematic flowchart of a method 900 for obtaining the content in a screenshot according to an example embodiment of the present disclosure.

FIG. 9 shows a schematic flowchart of a method 900 for obtaining the content in a screenshot according to an example embodiment of the present disclosure. In this embodiment, the screenshot may be shared with a user by a shot provider via a shot server. The method 900 may be used by the shot server.

After the method 900 starts, the screenshot and content organization information associated with the screenshot may be received from the shot provider at block S901.

According to the embodiment of the present disclosure, content organization information associated with the screenshot may be generated at the shot provider at predetermined intervals, and then the screenshot and its associated content organization information may be provided to the shot server. Accordingly, the shot server may receive from the shot provider the screenshot and its associated content organization information.

As described above, after the screenshot and the content organization information associated with the screenshot are received from the shot provider, a new data object identifier and a new version identifier may be allocated to each data object in the content organization information; meanwhile the received screenshot and all data objects in the associated content organization information as well as their respective data object identifiers and version identifiers may be stored in a memory directly. Alternatively, the received content organization information may be compared with previously stored content organization information, to determine whether to add or update a data object in the content organization information. According to other embodiments of the present disclosure, when adding a data object, a new data object identifier and a new version identifier may be set for the data object; and when updating a data object, a new version identifier may be set for the data object, and the same data object identifier as a previously stored data object may be set for the data object.

In the embodiment according to the present disclosure, the content organization information may comprise one or more data objects and a data object graph about these data objects. The data object graph may be, for example, a three-layered child-sibling tree, which data object graph may comprise a plurality of nodes. In one implementation, a root node in the data object graph may be a desktop presented in or associated with the screenshot, intermediate nodes may be application windows in the screenshot, and leaf nodes may be one or more units representing the content in the screenshot, wherein such a unit may be a text paragraph, a picture, audio or video, etc. Each root node, intermediate node or leaf node may be a data object, and their data structure may have various forms.

Table 1 shows one form of the data structure of a root node or intermediate node:

TABLE 1

Data Structure of Root Node or Intermediate Node

| ID | X | Y | Z | Height | Width | FirstChild | NextSibling | UpdateFlag |
|----|---|---|---|--------|-------|------------|-------------|------------|

Where:

ID is a data object identifier;

X is an X-coordinate value of a data object at the top left corner of the shot provider screen;

Y is a Y-coordinate value of the data object at the top left corner of the shot provider screen;

Z is a hierarchical coordinate value of the data object at the top left corner of the shot provider screen, for specifying the window hierarchy in presence of window coverage;

Height is a height of an area to which the data object belongs;

Width is a width of the area to which the data object belongs;

FirstChild is the first child node of the root node or the first data object child node of an intermediate node;

NextSibling is the next adjacent sibling node of the intermediate node, wherein the root node field is null; and UpdateFlag is a flag indicating whether the node has been changed between two adjacent refresh cycles, and its value may be denoted by 2 bits, wherein 00 denotes no change, 01 denotes a size and location change, 10 denotes that content of the node is changed, and 11 denotes that a location and content are changed.

Table 2 shows one form of the data structure of a leaf node:

TABLE 2

Data Structure of Leaf Node

| ID | X | Y | Z | Height | Width | DataType | Data | NextSibling | UpdateFlag |
|----|---|---|---|--------|-------|----------|------|-------------|------------|

Where:

ID is a data object identifier;

X is an X-coordinate value of the top left corner of a data object area relative to an application window;

Y is a Y-coordinate value of the top left corner of the data object area relative to an application window;

Z is a hierarchical coordinate value of the top left corner of the data object area relative to an application window;

Height is a height of an area to which the data object belongs;

Width is a width of the area to which the data object belongs;

DataType is a data type of the data object, e.g., text, picture, etc.;

Data is data of the data object, e.g., data composing text, picture, etc., which will be subsequently coded and decoded according to a data type specified by DataType;

NextSibling is the next adjacent sibling node of the data object node; and

UpdateFlag is a flag indicating whether the data object has been changed between two adjacent refresh cycles, and its value may be denoted by 2 bits, wherein 00 denotes no change, 01 denotes a size and location change without content change, 10 denotes a content change in the data object without size and location change, and 11 denotes a location and content change.

According to the embodiment of the present disclosure, at least part of the content organization information may comprise the structure and data of one or more data objects in the content organization information. At this point, the at least part of the content organization information may be the entirety of the content organization information, i.e., not only comprising all information of the root node or intermediate node with the data structure as shown in Table 1 but also comprising all information of the leaf node with the data structure as shown in Table 2.

According to the embodiment of the present disclosure, at least part of the content organization information may comprise only the structure of one or more data objects of the content organization information, excluding data of the one or more data objects. At this point, the at least part of the content organization information is not the entirety of the content organization information but only comprises the structure of the data object(s), specifically, comprising all information of the root node or intermediate node with the data structure as shown in Table 1 and all information of the leaf node with the data structure as shown in Table 2 except the "Data" field or the "Data" and "DataType" fields. It can be seen that the at least part of the content organization information does not comprise data of the data object, i.e., information on the "Data" field or the "Data" and "DataType" fields. Generally speaking, since data of the data object, namely information on the "Data" field, may correspond to a relatively large data amount, the communication bandwidth occupation can be reduced effectively and the transmission rate can be increased when only the at least part of the content organization information is transferred to the user.

At block S902, the structure of one or more data objects in the content organization information and the screenshot may be sent to the user.

In this embodiment, besides the screenshot, at least part of the content organization information may be sent to the user, specifically, the structure of one or more data objects in the content organization information. As described above, the structure of one or more data objects in the content organization information may comprise: for example, all information of the root node or intermediate node with the data structure as shown in Table 1 and all information of the leaf node with the data structure as shown in FIG. 2 except the "Data" field or the "Data" and "DataType" fields.

At block S903, selection information on user-desired content in the screenshot may be received.

The user may select desired content from the screenshot in various manners. For example, the user may click on and move the cursor to select an area in the screenshot, in which area there is user-desired content; also, the user may first click on to select a picture or an audio, specifying the picture or audio as his/her desired content. It is to be understood that the example is merely illustrative and should not be limit to the present disclosure.

In the case that the user clicks on and drags the mouse to select an area in the screenshot picture, a device at the user side may record the selected area's original location formation (e.g., X-coordinate $O_X$ and Y-coordinate $O_Y$) and size information (e.g., height $O_H$, width $O_W$). According to the embodiment of the present disclosure, the selection information may comprise location information on the user-desired content, e.g., the foregoing original location information and size information. At this point, selection information comprising the original location information and the size information may be received at block S903.

At block S904, data associated with the user-desired content in the screenshot may be determined from data of the one or more data objects based on the selection information.

As described above, the selection information received at block S903 may include the original location information and the size information. Then, at block S904, the original location information and the size information may be converted into updated location information and updated size information corresponding to a screen of the shot provider, and a data associated with the user-desired content may be determined according to the updated location information and the updated size information.

Specifically, a height $D_H$ and width $D_W$ of the shot provider's desktop may be determined from the content organization information. A height $P_H$ and width $P_W$ of the screenshot as displayed in the user's desktop may be obtained. Next, an updated location of the user-selected area in the shot provider's screen may be calculated by:

$$O'_Y=(D_H*O_Y)/P_H, \quad (1)$$

$$O'_X=(D_W*O_X)/P_W. \quad (2)$$

An update size of the user-selected area in the shot provider's screen may be calculated by:

$$O'_H=(D_H*O_H)/P_H, \quad (3)$$

$$O'_w=(D_W*O_w)/P_W. \quad (4)$$

Then, an application window involved in the user-selected area may be found from the content organization information based on the updated location $O'_X$ and $O'_Y$ and the updated size $O'_W$ and $O'_H$.

According to the embodiment of the present disclosure, the user-selected area might belong to one application or involve one or more applications. When the user-selected area belongs to one application, a data object involved in the selected area as well as a data object identifier and a version identifier of this data object may be determined according to the content organization information, and subsequently data of these data objects may be determined. When the user-selected area involves several applications, a data object or data objects in each of the several applications as involved in the selected area may be determined based on the content organization information, then data object identifiers and version identifiers of these involved data objects, and subsequently data of these data objects.

Additionally, it should be noted that according to an alternative embodiment of the present disclosure, the selection information may comprise: a data object identifier and a version identifier of a data object associated with the user-desired content. In such an embodiment, the procedures of converting the original location and size information into the updated location and size information corresponding to the shot provider's screen and determining a data object according to the updated location and size information as described at block S904 may be implemented at a device of the user side. At this point, what are comprised in the selection information sent from the user to the shot server are a data object identifier and a version identifier of a data object associated with the user-desired content as determined at the user side device, and the selection information may not comprise location information on the user-desired content.

At block S905, the determined data may be transferred to the user.

By sending to the user the data as determined according to the foregoing procedure, the user may obtain his/her desired content in the screenshot, so that the user experience is improved effectively and the user's demand for obtaining material is satisfied.

The method 900 ends after block S905.

Figure 10:
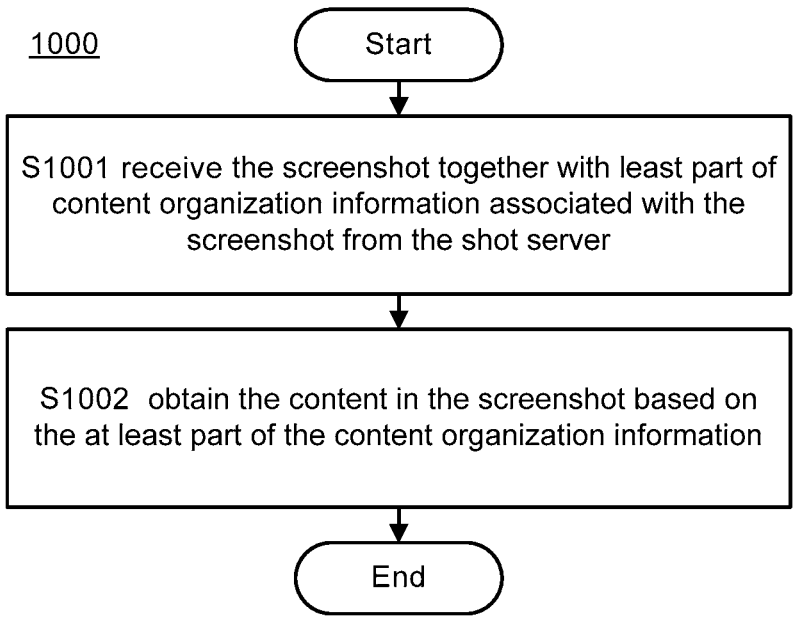
FIG. 10 shows a schematic flowchart of a method 1000 for obtaining the content in a screenshot according to an example embodiment of the present disclosure.

Reference is now made to FIG. 10, which shows a schematic flowchart of a method 1000 for obtaining the content in a screenshot according to an example embodiment of the present disclosure. In this embodiment, the screenshot may be shared with a user by a shot provider via a shot server. The method 1000 may be used at the user side device.

After the method 1000 starts, the screenshot together with least part of content organization information associated with the screenshot may be received from the shot server at block S1001.

According to the embodiment of the present disclosure, the at least part of the content organization information may comprise the structure and data of one or more data objects in the content organization information. In this embodiment, reference may be made to the processing procedure of the system 200 as shown by the embodiment in FIG. 2. After the shot server sends to the user the screenshot and the structure and data of one or more data objects in the content organization information, selection information on user-desired content in the screenshot may be determined at the user side device according to the user's selection of desired content in the screenshot and the received structure of one or more data objects; then, the content in the screenshot may be obtained based on the data of one or more data objects and the selection information.

According to the embodiment of the present disclosure, the at least part of the content organization information may also comprise only the structure of one or more data objects in the content organization information, except the data of the one or more data objects. In this embodiment, reference may be made to the processing procedure of the system 300 as shown by the embodiment in FIG. 3. After the shot server sends to the user the screenshot and the structure of one or more data objects in the content organization information, the shot server may receive selection information on user-desired content in the screenshot, then determine data associated with the user-desired content in the screenshot from the data of the one or more data objects based on the selection information, and finally transfer the determined data to the user.

At block S1002, the content in the screenshot may be obtained based on the at least part of the content organization information.

According to the embodiment of the present disclosure, when the received at least part of the content organization information comprises the structure and data of one or more data objects in the content organization information, the user side device may have all information of data objects (the structure of data objects plus data of the data objects) in the content organization information associated with the screenshot. At this point, the user side device may determine selection information on the user-desired content in the screenshot based on the user's selection of desired content in the screenshot and the received structure of one or more data objects, and obtain the content in the screenshot based on the data of one or more data objects and the selection information.

According to the embodiment of the present disclosure, when the received at least part of the content organization information comprises only the structure except data of one or more data objects in the content organization information, the user side device may determine selection information on the user-desired content in the screenshot according to the user's selection of desired content in the screenshot and the received structure of one or more data objects, send the selection information to the shot server, and receive from the shot server data associated with the user-desired content in the screenshot.

According to the embodiment of the present disclosure, at the user side device, a data object identifier and a version identifier of a data object associated with the user-desired content may be determined based on the location information and the structure of one or more data objects in the content organization information, and subsequently data of these associated data objects may be obtained according to data of the one or more data objects. In different embodiments, the selection information hence may comprise location information on the user-desired content, and may also comprise a data object identifier and a version identifier of a data object associated with the content.

The method 1000 ends after block S1002.

Figure 11:
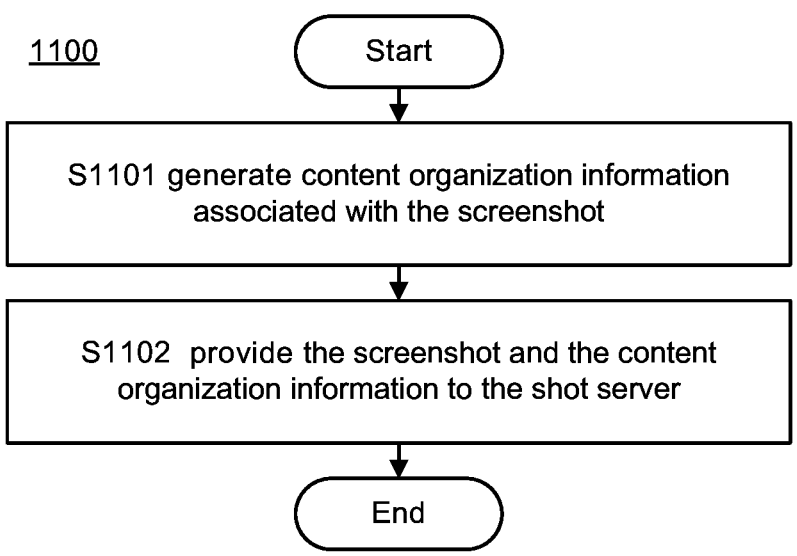
FIG. 11 shows a schematic flowchart of an apparatus 1100 for obtaining the content in a screenshot according to an example embodiment of the present disclosure.

Reference is now made to FIG. 11, which shows a schematic flowchart of a method 1100 for obtaining the content in a screenshot according to an example embodiment of the present disclosure. In this embodiment, the screenshot may be shared with a user by a shot provider via a shot server. The method 1100 may be used at the shot provider side device.

After the method 1100 starts, content organization information associated with the screenshot may be generated at block S1101.

According to the embodiment of the present disclosure, content organization information associated with the screenshot may be generated in several manners. For example, at least one application in the screenshot may be obtained first, a data object in each of the at least one application may be looked up, and then the structure and data of found data objects may be determined based on the screenshot, the at least one application and the found data objects, so that the content organization information associated with the entire screenshot is obtained.

In an embodiment of the present disclosure, during generating of the content organization information associated with the screenshot, the location, size and layer information of each application window on the screen and desktop may be recorded for creating a root node and intermediate node in a data object graph; then, the location, size, layer, data type, data content information, etc. of each unit within each application may be read for creating leaf nodes in the data object graph. Through the foregoing creation, a data object graph containing a three-layered tree may be obtained. In this example, the data object graph is the content organization information associated with the screenshot. In the data object graph, the root node and intermediate node may have, for example, the data structure as shown in Table 1, and the leaf node may have, for example, the data structure as shown in Table 2.

At block S1102, the screenshot and the content organization information may be provided to the shot server.

Only by providing the screenshot and the content organization information to the shot server, the shot server can enable the user to obtain desired content in the screenshot, so that the user experience is improved effectively and the user's demand for obtaining material is satisfied.

The method 1100 ends after block S1102.

The methods 800-1100 for obtaining the content in a screenshot according to the embodiments of the present disclosure have been described with reference to FIGS. 8-11. Hereinafter, apparatuses for performing the above methods will be described with reference to FIGS. 12-14.

Figure 12:
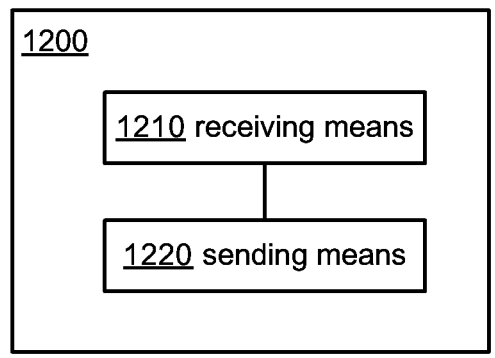
FIG. 12 shows a schematic flowchart of an apparatus 1200 for obtaining the content in a screenshot according to another example embodiment of the present disclosure.

Reference is now made to FIG. 12, which shows a schematic block diagram of an apparatus 1200 for obtaining the content in a screenshot according to an example embodiment of the present disclosure, wherein the screenshot is shared with a user by a shot provider via a shot server.

According to the embodiment of the present disclosure, the apparatus 1200 may comprise: receiving means 1210 configured to receive from the shot provider the screenshot and content organization information associated with the screenshot, wherein the content organization information comprises the structure and data of one or more data objects associated with the content in the screenshot; and sending means 1220 configured to send to the user the screenshot and at least part of the content organization information, so as to enable the user to obtain the content in the screenshot.

According to some embodiments of the present disclosure, the at least part of the content organization information may comprise the structure and data of one or more data objects in the content organization information.

According to some embodiments of the present disclosure, the at least part of the content organization information may comprise the structure of one or more data objects in the content organization information, without data of the one or more data objects. The apparatus 1200 may further comprise: selection information receiving means (not shown) configured to receive selection information on user-desired content in the screenshot; determining means (not shown) configured to determine data associated with the user-desired content in the screenshot from data of one or more data objects based on the selection information; and data transferring means (not shown) configured to transfer the determined data to the user.

According to some embodiments of the present disclosure, the selection information may comprise: location information of the user-desired content or a data object identifier and a version identifier of a data object associated with the content.

According to some embodiments of the present disclosure, the receiving means 1210 may comprise: looking-up means configured to look up previously stored content organization information that is associated with the screenshot; comparing means configured to compare the received content organization information with the previously stored content organization information; adding means configured to, if a data object in the obtained content organization information is not present in the previously stored content organization information, add the data object; and updating means configured to, if a data object in the obtained content organization information is present in the previously stored content organization information, update the data object in response to data of the data object being changed. When adding a data object, a new data object identifier and new version identifier are set for the data object; and when updating a data object, a new version identifier may be set for the data object, and the same data object identifier as a previously stored data object may be set for the data object.

Figure 13:
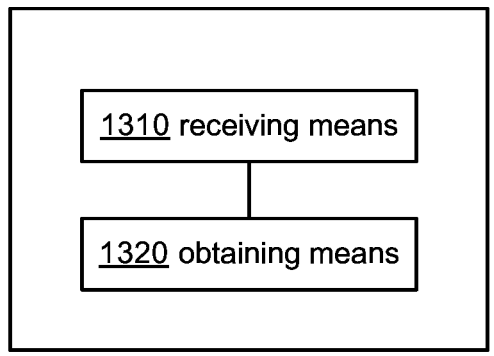
FIG. 13 shows a schematic flowchart of an apparatus 1300 for obtaining the content in a screenshot according to a further example embodiment of the present disclosure.

Now with reference to FIG. 13, this figure shows a schematic block diagram of an apparatus 1300 for obtaining the content in a screenshot according to another example embodiment of the present disclosure, wherein the screenshot is shared with a user by a shot provider via a shot server.

According to the embodiment of the present disclosure, the apparatus 1300 may comprise: receiving means 1310 configured to receive from the shot server the screenshot and at least part of content organization information associated with the screenshot, wherein the content organization information comprises the structure and data of one or more data objects associated with the content in the screenshot; and obtaining means 1320 configured to obtain the content in the screenshot based on the at least part of the content organization information.

According to some optional embodiments of the present disclosure, the at least part of the content organization information may comprise the structure and data of one or more data objects in the content organization information, wherein the obtaining means 1320 may comprise: means configured to determine selection information on user-desired content in the screenshot based on the user's selection of desired content in the screenshot and the structure of the one or more data objects; and means configured to obtain the content in the screenshot based on data of the one or more data objects and the selection information.

According to some embodiments of the present disclosure, the at least part of the content organization information may comprise the structure of one or more data objects in the content organization information, without data of the one or more data objects, wherein the obtaining means 1320 may comprise: means configured to determine selection information on user-desired content in the screenshot based on the user's selection of desired content in the screenshot and the structure of the one or more data objects; means configured to send the selection information to the shot server; and means configured to receive from the shot server data associated with the user-desired content in the screenshot.

Figure 14:
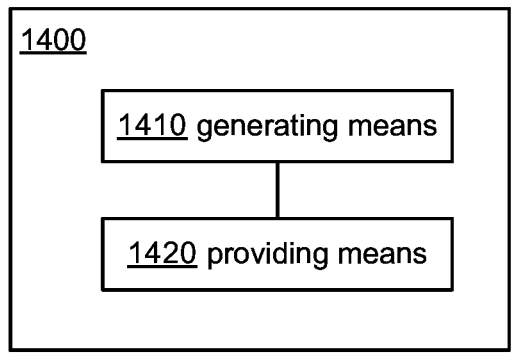
FIG. 14 shows a schematic flowchart of an apparatus 1400 for obtaining the content in a screen shot according to a further example embodiment of the present disclosure.

Now with reference to FIG. 14, this figure shows a schematic block diagram of an apparatus 1400 for obtaining the content in a screenshot according to a further example embodiment of the present disclosure, wherein the screenshot is shared with a user by a shot provider via a shot server.

According to the embodiment of the present disclosure, the apparatus 1400 may comprise: generating means 1410 configured to generate content organization information associated with the screenshot, wherein the content organization information comprises the structure and data of one or more data objects associated with the content in the screenshot; and providing means 1420 configured to provide the screenshot and the content organization information to the shot server, so as to enable the user to obtain the content in the screenshot.

According to some embodiments of the present disclosure, the generating means 1410 may comprise: obtaining means configured to obtain at least one application in the screenshot; looking-up means configured to look up a data object in each of the at least one application; and determining means configured to determine the structure and data of a data object based on the screenshot, the at least one application and the data object.

It is to be understood that the components and optional sub-components of the apparatuses 700, 1200, 1300 and 1400 that have been described above with reference to FIGS. 7, 12, 13 and 14 respectively correspond to the steps of the methods 400, 800, 1000 and 1100 that have been described above with reference to FIGS. 4, 8, 10 and 11. Hence, all features and operations described with respect to the methods 400, 800, 1000 and 1100 are also applicable to the apparatuses 700, 1200, 1300 and 1400, which are hence not detailed here.

In particular, the division of the components and optional sub-components of the apparatuses 700, 1200, 1300 and 1400 is not limiting but example. For example, the function of single component shown in FIGS. 7, 12, 13 and 14 may be performed by a plurality of components. Instead, a plurality of components shown in these figures may be implemented by single component. The scope of the present disclosure is not limited in this regard.

It is to be further understood that the components and optional sub-components comprised in the apparatuses 700, 1200, 1300 and 1400 may be implemented in various forms, including software, hardware, firmware or any combination thereof. For example, in some embodiments each component of the apparatuses 700, 1200, 1300 and 1400 may be implemented using software and/or firmware modules. Alternatively or additionally, the components of the apparatuses 700, 1200, 1300 and 1400 may be implemented using hardware modules. For example, each component of the apparatuses 700, 1200, 1300 and 1400 may be implemented as an integrated circuit (IC) chip or application-specific integrated circuit (ASIC). Each component of the apparatuses 700, 1200, 1300 and 1400 may also be implemented as a system on chip (SOC). Other forms that are currently known or to be developed in future are also feasible. In another example, as used herein each of the disclosed "units' and/or "means" may include one or more of a computer readable storage medium having instructions stored on it for performing the described operations and/or functions, one or more processors coupled with one or more memory architectures configured for performing the described operations and/or functions, and application specific hardware arrangements for performing the described operations and/or functions. Further, in some embodiments, the disclosed "units" and/or "means" may include combinations of the foregoing. For example, a described means may include one or more processors coupled with one or more memory architectures capable of executing computer program instructions stored on or ore more computer readable storage mediums for performing the described operations and/or functions. The scope of the present disclosure is not limited in this regard.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for obtaining the content in a screenshot, comprising:
obtaining, by one or more computing devices, content organization information associated with the screenshot, wherein the content organization information comprises a structure and data of one or more data objects associated with the content in the screenshot;
looking up previously stored content organization information that is associated with the screenshot;
comparing the obtained content organization information with the previously stored content organization information;
if a data object in the obtained content organization information is not present in the previously stored content organization information, performing adding operation for the data object;
if a data object in the obtained content organization information is present in the previously stored content organization information, performing updating operation for the data object in response to data of the data object being changed,
wherein in response to performing adding operation for a data object, a new data object identifier and a new version identifier are set for the data object; and in response to performing updating operation for a data object, a new version identifier is set for the data object, and the data object identifier same as that of a previously stored data object is set for the data object; and
determining, by the one or more computing devices, the content in the screenshot based on the content organization information.

2. The method according to claim 1, wherein the obtaining content organization information associated with the screenshot comprises:
obtaining at least one application in the screenshot;
looking up a data object in each of the at least one application; and
determining the structure and data of the data object based on the screenshot, the at least one application and the data object.

3. The method according to claim 1, wherein the obtaining content organization information associated with the screenshot comprises:
receiving content organization information associated with the screenshot, wherein the content organization information is generated at a shot provider.

4. The method according to claim 1, wherein the determining the content in the screenshot based on the content organization information comprises:
extracting data of one or more data objects in the content organization information; and
transferring the extracted data to a user.

5. The method according to claim 1, wherein the determining the content in the screenshot based on the content organization information comprises:
receiving user's selection information, wherein the selection information indicates information on user-desired content in the screenshot;
determining data associated with the user-desired content in the screenshot based on the selection information and the content organization information; and
transferring the determined data to the user.

6. The method according to claim 5, wherein the receiving a user's selection information comprises:
receiving location information of the user-desired content in the screenshot.

7. The method according to claim 5, wherein the receiving a user's selection information comprises:
receiving a data object identifier and a version identifier of a data object associated with of the user-desired content, wherein the data object identifier and the version identifier are determined at the user.

8. The method according to claim 5, wherein the determining the content in the screenshot based on the selection information and the content organization information comprises:
extracting location information on the user-desired content from the selection information;
determining a data object identifier and a version identifier of a data object associated with the content based on the location information and the structure of one or more data objects of the content organization information; and
determining data associated with the user-desired content in the screenshot from data of the one or more data objects of the content organization information according to the data object identifier and the version identifier.

9. The method according to claim 5, wherein the determining the content in the screenshot based on the selection information and the content organization information comprises:
extracting from the selection information a data object identifier and a version identifier of a data object associated with the user-desired content; and
determining data associated with the user-desired content in the screenshot from data of one or more data objects of the content organization information according to the data object identifier and the version identifier.

10. An apparatus for obtaining the content in a screenshot, comprising:
an obtaining unit configured to obtain content organization information associated with the screenshot, wherein the content organization information comprises a structure and data of one or more data objects associated with the content in the screenshot;
looking up previously stored content organization information that is associated with the screenshot;
comparing the obtained content organization information with the previously stored content organization information;
if a data object in the obtained content organization information is not present in the previously stored content organization information, performing adding operation for the data object;
if a data object in the obtained content organization information is present in the previously stored content organization information, performing updating operation for the data object in response to data of the data object being changed,
wherein in response to performing adding operation for a data object, a new data object identifier and a new version identifier are set for the data object; and in response to performing updating operation for a data object, a new version identifier is set for the data object, and the data object identifier same as that of a previously stored data object is set for the data object; and a determining unit configured to determine the content in the screenshot based on the content organization information.

11. The apparatus according to claim 10, wherein the obtaining unit comprises:

obtaining means configured to obtain at least one application in the screenshot;

data object looking-up means configured to look up a data object in each of the at least one application; and determining means configured to determine the structure and data of the data object based on the screenshot, the at least one application and the data object.

12. The apparatus according to claim 10, wherein the obtaining unit comprises:

receiving means configured to receive content organization information associated with the screenshot, wherein the content organization information is generated at a shot provider.

13. The apparatus according to claim 10, wherein the determining unit comprises:

extracting means configured to extract data of one or more data objects in the content organization information; and first transferring means configured to transfer the extracted data to a user.

14. The apparatus according to claim 10, wherein the determining unit comprises:

selection information receiving means configured to receive user's selection information, wherein the selection information indicates information on user-desired content in the screenshot;

content determining means configured to determine data associated with the user-desired content in the screenshot based on the selection information and the content organization information; and second transferring means configured to transfer the determined data to the user.

15. The apparatus according to claim 14, wherein the selection information receiving means comprises:

location information receiving means configured to receive location information of the user-desired content in the screenshot.

16. The apparatus according to claim 14, wherein the selection information receiving means comprises:

identifier receiving means configured to receive a data object identifier and a version identifier of a data object associated with of the user-desired content, wherein the data object identifier and the version identifier are determined at the user.

17. The apparatus according to claim 14, wherein the content determining means comprises:

location information extracting means configured to extract location information on the user-desired content from the selection information;

identifier determining means configured to determine a data object identifier and a version identifier of a data object associated with the content based on the location information and the structure of one or more data objects of the content organization information; and first data determining means configured to determine data associated with the user-desired content in the screenshot from data of the one or more data objects of the content organization information according to the data object identifier and the version identifier.

18. The apparatus according to claim 14, wherein the content determining means comprises:

identifier extracting means configured to extract from the selection information a data object identifier and a version identifier of a data object associated with the user-desired content; and second content determining means configured to determine data associated with the user-desired content in the screenshot from data of one or more data objects of the content organization information according to the data object identifier and the version identifier.

* * * * *